/

US010425766B2

(12) United States Patent
Fogg et al.

(10) Patent No.: US 10,425,766 B2
(45) Date of Patent: Sep. 24, 2019

(54) LOCATION SYSTEMS USING SHORT-RANGE COMMUNICATIONS

(71) Applicant: Virtual Perimeters Limited, Liverpool, Merseyside (GB)

(72) Inventors: Lee Fogg, Wigan (GB); Clifford Kirby, Sefton Village (GB)

(73) Assignee: Virtual Perimeters Limited, Liverpool, Merseyside (GB)

( * ) Notice: Subject to any disclaimer, the term of this patent is extended or adjusted under 35 U.S.C. 154(b) by 0 days.

(21) Appl. No.: 15/741,471

(22) PCT Filed: Jul. 1, 2016

(86) PCT No.: PCT/GB2016/052000
§ 371 (c)(1),
(2) Date: Jan. 2, 2018

(87) PCT Pub. No.: WO2017/001867
PCT Pub. Date: Jan. 5, 2017

(65) Prior Publication Data
US 2019/0075421 A1   Mar. 7, 2019

(30) Foreign Application Priority Data
Jul. 2, 2015   (GB) .................................. 1511662.7

(51) Int. Cl.
*H04W 24/00* (2009.01)
*H04W 4/021* (2018.01)
(Continued)

(52) U.S. Cl.
CPC ............. *H04W 4/021* (2013.01); *H04W 4/80* (2018.02); *H04W 64/00* (2013.01);
(Continued)

(58) Field of Classification Search
CPC ....... H04W 4/021; H04W 4/80; H04W 88/02; H04W 88/06; H04M 1/72519; H04M 1/72522; H04M 1/7253
(Continued)

(56) References Cited

U.S. PATENT DOCUMENTS 8,090,364 B2 * 1/2012 Delalat ............... G08B 13/1418
455/420
8,989,053 B1 * 3/2015 Skaaksrud ............ H04W 12/06
370/255
(Continued)

FOREIGN PATENT DOCUMENTS

CN        202815226 U    3/2013
CN        103178616 A    6/2013
(Continued)

OTHER PUBLICATIONS

Search and Examination Report from Great Britian Application No. 1511662.7, dated Dec. 31, 2015, 4 pages.
(Continued)

Primary Examiner — Danh C Le
(74) Attorney, Agent, or Firm — TraskBritt

(57) ABSTRACT

This application relates to location systems suitable for monitoring the locations of people or objects within a group. Each person or object has a master or slave unit, which has a short-range wireless transceiver. Each unit has a unique identifier, and an ad-hoc mesh network is created between the units using short-range wireless connections between the units. Each unit periodically broadcasts its ID, which is received by other in-range units, and which compiles a list of received IDs and routing data (the IDs of the other units from which each ID was received). The IDs and routing data are shared on the ad-hoc mesh network, enabling the locations of the units to be approximately triangulated by placing the master or slave units in a virtual map in which the routing (Continued)

data for each received ID corresponds to that of second data signal, and wherein the placement of the master or slave units in the virtual map is also correct with regard to the estimated range of each master or slave unit. Each unit is able to determine its absolute position, when required, for example, using a GPS receiver, and this can also be shared on the ad-hoc mesh network. By using primarily short-range communications, the power consumption of each unit is reduced, as well as the incidence of erroneous transmission of signals to an external or public network. However, the master unit has a long-range wireless transceiver to enable it to transmit, for example, a distress signal to an external remote monitoring station.

20 Claims, 6 Drawing Sheets

(51) Int. Cl.
    *H04W 64/00*     (2009.01)
    *H04W 4/80*     (2018.01)
    *H04W 84/18*     (2009.01)
    *H04M 1/725*     (2006.01)
    *H04W 88/02*     (2009.01)
    *H04W 88/06*     (2009.01)

(52) U.S. Cl.
    CPC ...... *H04M 1/7253* (2013.01); *H04M 1/72519* (2013.01); *H04M 1/72522* (2013.01); *H04W 84/18* (2013.01); *H04W 88/02* (2013.01); *H04W 88/06* (2013.01); *Y02D 70/124* (2018.01); *Y02D 70/126* (2018.01); *Y02D 70/1222* (2018.01); *Y02D 70/1224* (2018.01); *Y02D 70/142* (2018.01); *Y02D 70/144* (2018.01); *Y02D 70/162* (2018.01); *Y02D 70/164* (2018.01); *Y02D 70/22* (2018.01); *Y02D 70/26* (2018.01)

(58) Field of Classification Search
    USPC .................. 455/456.1, 41.2, 550.1
    See application file for complete search history.

(56) References Cited

U.S. PATENT DOCUMENTS

| | | |
|---|---|---|
| 2005/0143096 A1 | 6/2005 | Boesch |
| 2008/0267062 A1* | 10/2008 | Feuer ................ H04M 3/42314 370/219 |
| 2008/0268830 A1 | 10/2008 | Sharma et al. |
| 2010/0203837 A1 | 8/2010 | Taniguchi |
| 2013/0084973 A1 | 4/2013 | Frady |
| 2013/0217332 A1 | 8/2013 | Altman et al. |
| 2014/0167955 A1 | 6/2014 | Mahajan |
| 2015/0084769 A1* | 3/2015 | Messier ............ G08B 21/0277 340/539.13 |
| 2015/0154548 A1* | 6/2015 | Skaaksrud ............ H04W 12/06 705/333 |
| 2015/0246676 A1* | 9/2015 | Keren ................ B60W 30/146 701/93 |
| 2016/0094934 A1* | 3/2016 | Yang ..................... H04W 8/005 455/41.2 |
| 2016/0353249 A1* | 12/2016 | Khatam ................ G06Q 10/02 |
| 2017/0311092 A1* | 10/2017 | Secall ................. H04R 25/554 |
| 2018/0084371 A1* | 3/2018 | Scagnol ................ G01S 5/0205 |
| 2018/0199282 A1* | 7/2018 | Newham ........... H04W 52/0206 |

FOREIGN PATENT DOCUMENTS

| | | |
|---|---|---|
| EP | 0921411 A2 | 6/1999 |
| GB | 2409951 A | 7/2005 |
| GB | 2459880 A | 11/2009 |
| KR | 10-0617149 B1 | 8/2006 |
| KR | 10-2006-0131182 A | 12/2006 |
| WO | 2002/051193 A1 | 6/2002 |
| WO | 2009/035760 A1 | 3/2009 |
| WO | 2009063115 A1 | 5/2009 |
| WO | 2011/082208 A2 | 7/2011 |

OTHER PUBLICATIONS

International Search Report from International Application No. PCT/GB2016/052000, dated Sep. 29, 2016, 3 pages.
International Written Opinion from International Application No. PCT/GB2016/052000, dated Sep. 29, 2016, 6 pages.

* cited by examiner

LOCATION SYSTEMS USING
SHORT-RANGE COMMUNICATIONS

CROSS-REFERENCE TO RELATED APPLICATIONS

This application is a national phase entry under 35 U.S.C. § 371 of International Patent Application PCT/GB2016/052000, filed Jul. 1, 2016, designating the United States of America and published in English as International Patent Publication WO 2017/001867 A1 on Jan. 5, 2017, which claims the benefit under Article 8 of the Patent Cooperation Treaty to Great Britain Patent Application Serial No. 1511662.7, filed Jul. 12, 2015.

TECHNICAL FIELD

This application relates to a location system, and in particular, to a collective location system for a group of local network-connected devices.

BACKGROUND

Location systems generally are very well known, and mostly nowadays use GPS systems interconnected with communications systems to broadcast location data on a periodic, continuous or on an ad-hoc basis.

Location systems are used in a great many situations ranging from relatively mundane applications, such as vehicle tracking (for example, in the logistics industry to monitor the locations of vehicles and payloads); to more critical applications, such in as search and rescue operations (for example, in distress beacons for locating ships or aircraft).

In all known cases, the basic principle of operation of the location device is largely the same, that is to say, the system ascertains its position (for example, using GPS), and broadcasts its position (for example, using a Public Wireless Mobile Telephony Network (PWMTN), a satellite phone link, VHF radio signaling, etc.) to a remote receiving station. The received position data can then be processed by the remote receiving station in a variety of ways, such as by placing markers on maps, generating alerts, deploying resources, etc.

Examples of known location systems, such as those described above, are known from the following:

US 2014/167955A discloses a system for allowing a master device to locate a plurality of slave devices, wherein the system may be used in an emergency, may trigger an alarm via a cellular communication network and may locate the position of each slave device on a map via GPS. However, this document does not teach using short-range wireless communications between the slave units and using a daisy-chain of signals to relay the locations of other in-range slave units to other slave units and then to the master unit.

KR 2006/0131182A discloses a system involving GPS for alerting the user of a mobile terminal if they exit a safety zone, and may further involve alerting of a guardian. Here, the communications are all long-range, i.e., over a PWMTN and there is no disclosure of daisy-chaining signals enabling the use of short-range, and hence low-power, signals.

US 2005/143096A discloses a system for monitoring the location of group members providing an indication of when the user nears a perimeter such as in the form of a graphical display and may sound an alarm. However, each mobile phone connects directly to the master unit, rather than communicating with their nearest neighbors.

US 2008/268830A discloses a system for proximity detection of coverage area boundary that may provide the user with a visual indication and audio warning of boundary location. This is essentially an in-bounds/out-of-bounds system with no direct relevance to this disclosure.

EP0921411A discloses a system for monitoring boats involving the use of a GPS and a public telephone network to report ships' positions in an emergency. This system relies solely upon long-range communications.

CN103178616A discloses a wireless positioning system with forbidden zone management that may send out an alarm signal if workers are in the zone.

US 2013/084973A discloses a system for providing proximity based alerts to a wireless device associated with a user.

CN202815226U discloses a terminal that allows the user to monitor the location of students via the use of GPS and a GPRS network communication module that may allow for the monitoring of students outside security zones.

WO 11082208A discloses an animal monitoring system involving a communication device and tags for sensing and triggering if an animal crosses a physical zone or boundary.

WO 09035760A discloses a system for alerting a user of a mobile device of the proximity of a target party, wherein the alert may include map data.

GB2459880A discloses a system for monitoring workers via a wireless network, wherein users may receive a warning if they enter a safety zone.

KR100617149B discloses a system for indicating to the user that they are leaving a predefined area, involving the use of GPS, mapping information and text messaging.

WO 0251193A discloses a system that may generate an action when a mobile station approaches a boundary.

It will be appreciated from the foregoing that known locations systems work very well, but in certain applications, there can be problems:

First, known location systems such as those described above utilize long-range communications systems to broadcast the location data to the remote monitoring station. This has several practical implications, such as using relatively large amounts of power, which limits how long such systems can operate using relatively small batteries. Thus, miniaturization of known battery-powered location systems is restricted by power requirements, often meaning that a trade-off needs to be struck between miniaturization and duty cycle.

Second, known location system such as those described above broadcast data over public telephony or communications networks. This means that there is a potential for data broadcasts to be misdirected (leading to potential security breaches) and for false alarm signals to be sent to emergency services, which can result in unnecessary deployment of emergency services resources. Also, in certain situations (for example, tracking people or items inside a building or within a limited perimeter), there is no need for a connection to the "outside world," so the use of public/external communications is contraindicated.

Third, broadcasting data over public communications networks often requires a license or a subscription fee to be paid (e.g., for use of the communications network), which can be uneconomic for some users.

BRIEF SUMMARY

This disclosure aims to provide a solution to one or more of the above problems, and/or to provide an improved and/or an alternative to known locations systems.

Various aspects of the disclosure are set forth in the appended claims.

According to a first aspect of the disclosure, there is provide a location system comprising one or more master units and one or more slave units; the or each master unit comprising: a location detection means operatively connected to a short-range wireless transceiver adapted to broadcast the location of the master unit, and a long-range wireless transceiver; the or each slave unit comprising: a location detection means operatively connected to a short-range wireless transceiver adapted to broadcast the location of the slave unit, wherein the short-range wireless transceivers of the master and slave units are: adapted to receive the locations of other in-range master or slave units; and to broadcast a first data signal comprising the location of the master or slave unit and the locations of other in-range master or slave units; and wherein the short-range wireless transceivers of the master units are: adapted to receive the first data signals of in-range master or slave units; and to broadcast a second data signal comprising the locations of the master and slave units contained in the received first data signals; and wherein the or each master unit is adapted to selectively broadcast the second data signal via the long-range wireless transceiver.

According to a second aspect of the disclosure, there is provided location system comprising one or more master units and one or more slave units; the or each master unit comprising: a short-range wireless transceiver and a location detection means operatively connected to the short-range wireless transceiver, the short-range wireless transceiver being adapted to periodically broadcast an ID of the master unit and to selectively broadcast the location of the master unit as determined by the master unit's location detection means, and a long-range wireless transceiver; the or each slave unit comprising: short-range wireless transceiver and a location detection means operatively connected to the short-range wireless transceiver, the short-range wireless transceiver being adapted to periodically broadcast an ID of the slave unit and to selectively broadcast a location of the slave unit as determined by the slave unit's location detection means, wherein the short-range wireless transceivers of the master and slave units are adapted receive the IDs and, where available, the locations of other in-range master or slave units; and to broadcast a first data signal comprising the IDs, and where available, the location of the master or slave unit and the ID and, where available, the locations of other in-range master or slave units; and wherein the short-range wireless transceivers of the master units are adapted receive the first data signals of in-range master or slave units and to broadcast a second data signal comprising the IDs and, where available, the locations of the master and slave units contained in the received first data signals; and wherein the or each master unit is adapted to selectively broadcast the second data signal via the long-range wireless transceiver.

Thus, an embodiment of the disclosure relates to a networked system of slave units that communicate with one another and with a master unit, either directly, or indirectly, via other slave or master units in a local network defined by the short-range wireless transceivers. This creates a type of mesh network in which the master and slave units can relay data between each other in a daisy-chain fashion. This means that there is no need for each of the slave units to be in-range of a master unit directly and so the system can operate locally using only short-range wireless transceivers. This has many practical advantages, chief amongst which being a reduced power consumption and/or requirement of the slave units. Thus, the slave units may be operated on battery power for longer durations than if they had, or required, longer-range transceivers to be able to communicate directly with the or each master unit.

In certain embodiments of the disclosure, the location detection means comprises a GPS receiver, which is able to determine the location of the respective unit. Suitably, the GPS unit, when activated, is able to output instantaneous location data of the master of slave unit. The location data from the GPS receiver is suitably processed, for example, using an on-board processing unit. The processed location data is then selectively broadcast, via the short-range wireless transceiver to other in-range master or slave units.

Meanwhile, the wireless transceiver is configured to receive the IDs, and where available, the location data of other in-range master or slave units. The ID and location data of a particular master or slave unit can thus be appended to the received ID and location data of other master or slave units in the system, and re-broadcast via the short-range wireless transceiver.

In a normal mode of operation, the units are configured to broadcast their IDs periodically, say every few seconds. Suitably, the second data signal contains logical information associated with each received ID. In one embodiment, the second data signal contains not only a list of IDs, but also routing data for the IDs.

Consider, for example, a location system in accordance with the disclosure in which there are three slave units (S1, S2 and S3) and a single master unit M1. Initially, S1 and S2 are in-range of M1 via their short-range wireless transceivers; and S3 is initially in-range only of S2 via their short-range transceivers.

In this situation, the second data signal may contain the IDs of all four devices, but also the routing data. For example, in this particular example, the second data signal at M1 may be: S1ID(IDS1); S2ID(IDS2); S3ID(IDS2), where the IDs in brackets signify from which unit the respective ID was received.

Now, slave unit S3 moves in-range of both S1 and S2, so the second data signal may be updated to be: S1ID(IDS1); S2ID(IDS2); S3ID(IDS1, IDS2).

Then, slave unit S3 moves out-of-range of S2, but remains in-range of range of S1, so the second data signal now becomes: S1ID(IDS1); S2ID(IDS2); S3ID(IDS1).

It will be appreciated from the foregoing, that a basic form of triangulation can be used, based on the routing data of the received IDs, to establish the approximate locations of the units in the location system.

The master and slave units are configured to selectively broadcast their locations (as determined by their location detection means) in certain situations. An event trigger may be used to initiate the broadcasting of a particular unit's location. Various triggers may be employed, but in a situation where the location system is aimed at preventing the loss of persons from a group, broadcasting of a unit's location may be initiated where a particular unit is only in-range of a certain minimum number of other units, for example, two other units, or just one other unit.

The reason that this type of trigger may be of particular relevance, is that when a given unit is only in-range of one other unit, triangulation of its position (relative to other units) becomes difficult, or impossible.

However, according to the disclosure, each unit has its own location detection means, and so it is possible for each unit to broadcast its location periodically, say every second or so. Hopefully, the unit in question will have broadcast its instantaneous position several times before if finally goes out-of-range of all other units. By logging the location data of a particular unit, it becomes possible to estimate, or calculate accurately, that unit's speed and direction of travel immediately before it is "lost" to the remainder of the location system. This clearly provides vital information for a search party trying to relocate the missing unit.

A master unit in the system suitably comprises a master processing unit, which is adapted to compile the second data signal, which may comprise an ID and a last known location of each master or slave unit in the system. The second data signal can thus be broadcast, as and when desired, via the long-range wireless transmitter or transceiver of the master unit, for example, to a remote monitoring station.

In one embodiment of the disclosure, each unit is configured to determine its position, periodically, using GPS and the GPS coordinates are broadcast by the short-range transceiver of the unit. Each slave unit, therefore, broadcasts its own position, and receives the locations of other slave units in range of it at intervals of, say, a few second to a few minutes.

It will be appreciated, that eventually, the ID (and when activated, the corresponding location data) of every master and slave unit in the system will be received by at least one master unit, which can compile the IDs (and, where available, the location data) into the second data signal ready for broadcasting via the long-range wireless transmitter or transceiver, as and when needed.

In certain embodiments of the disclosure, the master processing unit is operatively connected to an output means, such as a display screen. The master unit may thus be configured to process the IDs and locations of each of the other master and slave units in the system and process the data, for example, by plotting the positions of the units on a map, or on a relative map (e.g., a "radar-type" display).

Additionally, or alternatively, the master unit may be configured to identify potential alarm situations, for example, other units moving out of range, or outside a defined perimeter. In such situations, the master unit may emit an alarm signal, which may be an audible and/or visual alarm or warning. In yet further embodiments, the triggering of an alarm at the master unit may trigger the broadcasting of a corresponding alarm signal via the long-range transceiver. Additionally or alternatively, the alarm signal may be broadcast and relayed to all units in the location system via the short-range wireless transceivers (only).

Advantages of the disclosure are manifold:

First, the disclosure creates its own, ad-hoc wireless network, which may have no intrinsic connection to the outside world. Thus, an alarm situation within the local network can be effectively contained, thus addressing one or more of the problems outlined above, such as inadvertently broadcasting a false alarm signal to actual emergency services. However, local alarms can nevertheless be raised, for example, at the master unit, or at any one or more of the slave units, to notify local users of a potential alarm situation.

Second, each slave unit only needs a short-range transceiver, which can thus be a low-power transceiver. This is accomplished by the provision of a mesh-type network in which each unit only needs to be in range of one or more other units, and not necessarily in-range of all other units in the system. Such a configuration can result in an unexpected range extension of the system, i.e., units can communicate with one another over much larger distances than the power of their individual transceivers may imply.

Third, because each slave unit only has a short-range transceiver, if one slave unit strays from the network by a relatively small distance, it is easily identified as a "dropout." In particular, if the master unit is configured to repeatedly plot the locations of the slave units over time, it is possible to ascertain the "last known position" and "direction of travel" of slave units that have gone out of range. Such a configuration may be particularly useful to facilities re-location of "lost" slave units.

In certain embodiments of the disclosure, each unit (master or slave) may comprise an alarm trigger button that, when pressed, causes the unit to broadcast an alarm signal via the short-range transceiver.

In certain embodiments of the disclosure, each unit (master or slave) may comprise an alarm output unit that, upon reception of an alarm signal from another unit, emits an audible and/or visual and/or tactile alarm signal. Such a configuration may facilitate alerting other users to a potential emergency situation. In certain embodiments of the disclosure, the alarm output unit may be configured to automatically emit a conditional audible and/or visual and/or tactile alarm signal, for example, when a given unit goes out of range of other units.

The disclosure may be particularly suited for use by groups of people, for example, to monitor the locations of children, for example, on an outing. Each child may be provided with a slave unit in accordance with the disclosure in, for example, the form of a wristband, whereas a supervisor may be provided with a master unit, for example, a different type of wristband that, in certain embodiments, connects to a mobile telephone or portable device. By using the system of the disclosure, the supervisor may be able to monitor the locations of the children by, for example, dots on a map displayed on the portable electronic device. The portable electronic device may be configured to process the data, e.g., to alert the supervisor when children approach or cross a designated boundary.

Additionally or alternatively, the disclosure may be used as a safety device in, for example, water sports activities. In one example, each boat in flotilla may be provided with a slave unit, and a safety boat may be provided with a master unit.

The long-range transceiver of the master unit may be integrally formed with the master unit, or the master unit may be operatively connected to a long-range transceiver. For example, the master unit may connect, for example, via a Bluetooth or other wireless connection system, to a mobile telephone, so that the master unit can connect to a remote monitoring station via a public telephony network. In other embodiments, the master unit connects to other types of long-range communications systems, such as VHF radio system, a GMDSS transceiver, a satellite telephone line, etc. Thus, whilst the master and slave units can communicate with one another on the ad-hoc local network, making a connection to the "outside world" is effected on a separate network. This can reduce the likelihood of false alarms being broadcast to emergency services.

Suitably, the communications system is configured to selectively broadcast the second data signal via the long-range wireless transceiver upon receipt of an alarm trigger. The or each master or slave unit may further comprise an alarm trigger and means for broadcasting an alarm signal via the short-range transceiver. In certain embodiments, the or each master unit may further comprise an alarm trigger and means for broadcasting an alarm signal via the long-range transceiver.

The or each master unit is suitably adapted to automatically broadcast the second data signal via the long-range wireless transceiver upon receipt of an alarm signal.

Suitably, the location detection means comprises a GPS receiver. Suitably, the location detection means is inactive for most of the time, but is preferably in a standby state (low power consumption) and ready for use in an emergency situation as described herein.

Suitably, the short-range wireless transceiver comprises any one or more of the group comprising: Microchip MiWi® (AN1066); ZigBee®; Bluetooth®; and Wi-Fi® Suitably, the long-range wireless transceiver comprises any one or more of the group comprising: a public wireless telephony transceiver (GSM, GPRS, 3G, 4G etc.); a satellite telephony transceiver; a VHF/UHF transceiver; and an EPIRB transceiver.

Preferably, the second data signal comprises any one or more of the group comprising: an SMS message; and an automated voice message containing the locations of the master or slave units. Thus, the communications system is suitably configured to transmit, via a public wireless telephony network, the SMS message or the automated voice message to a pre-designated telephone number. Suitably, the pre-designated telephone number comprises an emergency telephone number, such as 999, 911, 2222, etc.

BRIEF DESCRIPTION OF THE DRAWINGS

Embodiments of the disclosure shall now be described, by way of example only, with reference to the accompanying drawings in which.

DETAILED DESCRIPTION

Figure 1:
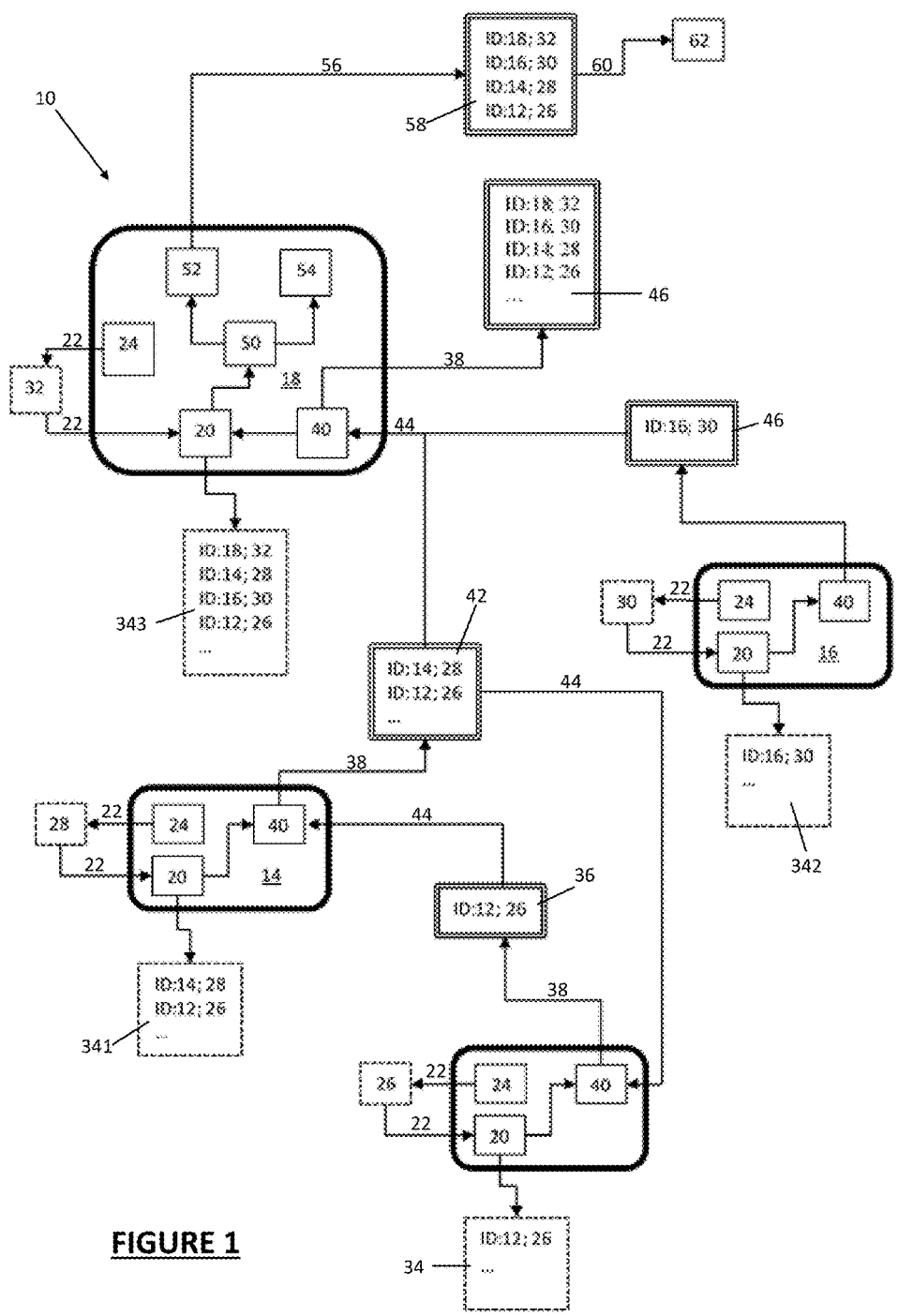
FIG. 1 is a schematic block diagram of a system in accordance with an embodiment of the disclosure.

Referring to FIG. 1, a system 10 in accordance with the disclosure has three slave units 12, 14, 16 and a master unit 18 (although it will be appreciated that any number of master or slave units could be used). Each unit 12, 14, 16, 18 comprises a CPU 20 that is operatively connected 22 to a location detection device, in this example, a GPS receiver 24. The GPS receiver 24 determines the position 26, 28, 30, 32 of the unit 12, 14, 16, 18, respectively and passes the position 26, 28, 30, 32 to the CPU 20, which compiles a list file 34, 34$_1$, 34$_2$, 34$_3$ containing the ID of the unit 12, 14, 16, 18 and its position 26, 28, 30, 32. The list file 34 is encoded into a first data signal 36, which is broadcast 38, via a short-range wireless transceiver 40 of each unit 12, 14, 16, 18 to other in-range units 12, 14, 16, 18 in the system 10.

Referring to FIG. 1, a first slave unit 12 is only in-range of a second slave unit 14. Thus, its first data signal 36 is only received by the short-range wireless transceiver 40 of the second slave unit 14. Thus, the CPU 20 of the second slave unit 14 compiles a list file 34$_1$ containing the ID and position 28 of the second slave unit 14, as well as the ID and position 26 of the first slave unit 12. Thus, the first data signal 42 of the second slave unit 14 contains the IDs and corresponding positions of the first and second slave units 12, 14. This is broadcast 38 by the short-range wireless transceiver 40 of the second slave unit and is received 44 by the short-range wireless transceiver 40 of the first slave unit 12 (which then updates its list file 34 to include the ID and position 28 of the second slave unit 14). The next time the first slave unit 12 broadcasts is first data signal 36, the second slave unit 14 will append all of the entries in the first slave unit's first data signal 36 to its own list file 34$_1$, but will de-duplicate the entries to avoid duplication of IDs and position data.

Meanwhile, the second slave unit's first data signal 42 is received 44 by the short-range wireless transceiver 40 of the master unit 18. The master unit likewise appends the data from the second slave unit's first data signal 42 to its list file 34$_2$, and de-duplicates the entries.

Meanwhile, a third slave unit 16, which is only in-range of the master unit 18 broadcasts its ID and position 30 via its short-range wireless transceiver 40 and its first data signal 46 is received 44 by the short-range wireless transceiver 40 of the master unit 18. Again, the master unit appends the data from the third slave unit's first data signal 46 to its list file 34$_2$, and de-duplicates the entries.

The master unit's first data signal 48 (which by this time, contains all of the IDs and positions 26, 28, 30, 32 of all of the units 12, 14, 16, 18 in the system 10) is then re-broadcast by its short-range wireless transceiver 40, resulting in all of the units 12, 14, 16, 18 being able to compile list files 34, 34$_1$, 34$_2$, 34$_3$ containing all of the IDs and positions 26, 28, 30, 32 of all of the units 12, 14, 16, 18 in the system 10. This sharing, updating and replication of data usefully provides redundancy in the system 10 meaning that when another slave or master unit comes in-range of another unit already connected to the system, it only needs to wait for one "update cycle" before its list file contains all of the IDs and positions of the units in the system 10.

Figure 2:
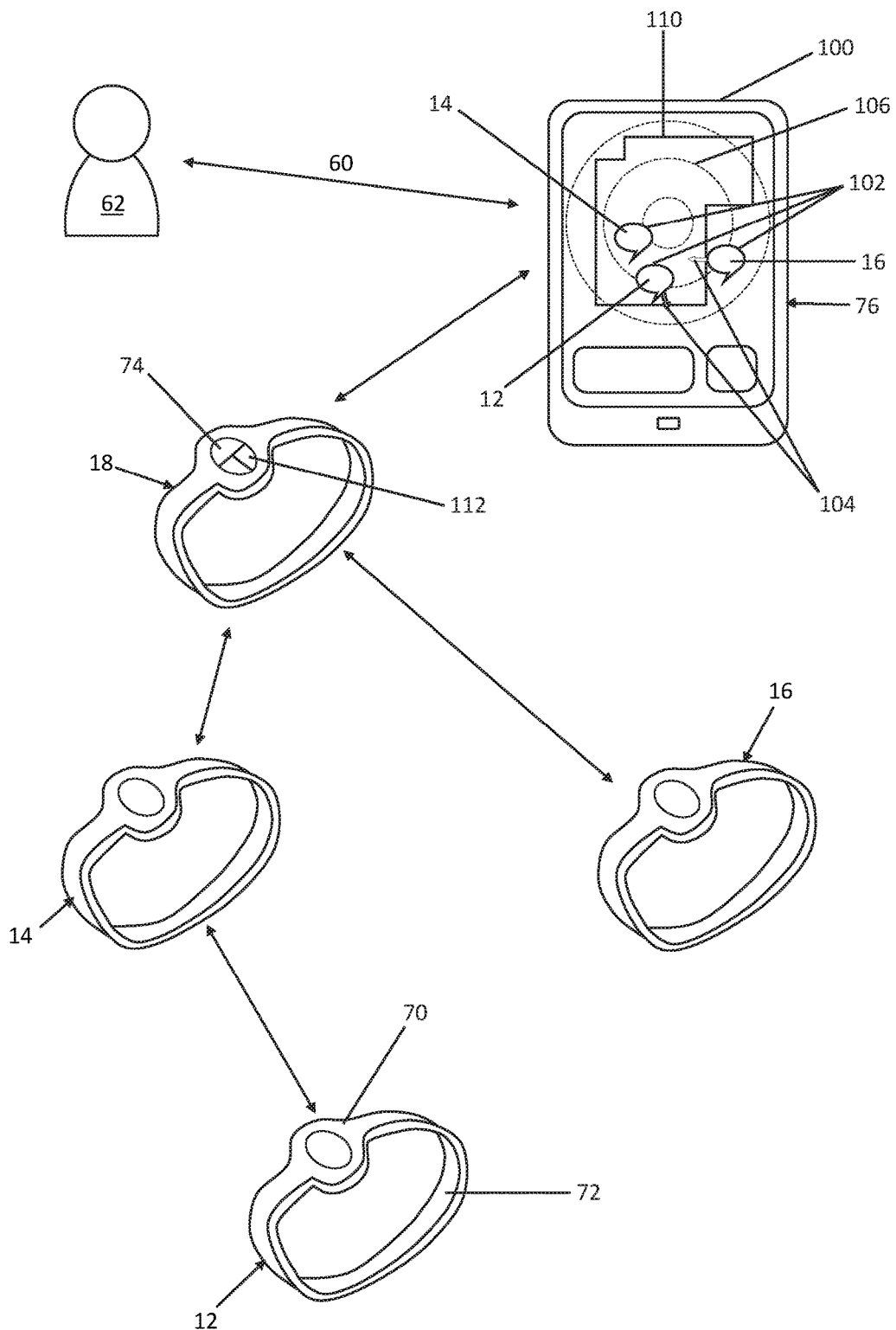
FIG. 2 is a schematic view of the system of FIG. 1.

In the example of FIG. 2, it will be noted that the master unit 18 differs from the slave units by the provision of additional components, although the system 10 could comprise a plurality of master units in which some functions of various units are disabled or suppressed. In fact, it will be appreciated that by providing a system in which all of the units are "master" units, but in which only one or a few are designated masters, should one "master" unit fail, it is possible to enable certain components of other units to render them "master" units to take over the master unit's functionality. In other embodiments, however, the slave units could be stripped-down versions of the master unit, for example, to reduce cost and complexity.

Nevertheless, in FIG. 1, the master unit 18 additionally comprises an input-output (I/O) interface 50 that provides bi-directional communications with a long-range wireless transceiver 52 and an output device 54. The master unit may, therefore, on-demand, or at intervals, broadcast 56, via the long-range wireless transceiver 52, a second data signal 58 corresponding to the master unit's list file 34$_3$, for example, over a public wireless telephone network, for reception 60 by a remote monitoring station 62. The remote monitoring station 62 may comprise an automated system, or it may be a manned control center. In either event, upon reception 60 of the second data signal 58, the remote monitoring station 62 may take various actions in relation thereto, for example, deploying emergency services.

Referring now to FIG. 2, it will be seen that the system 10 previously described has been implemented as a set of silicone wristbands, which are waterproof, durable and convenient to wear by users (not shown). Each slave unit 12, 14, 16 comprises a main body portion 70 that houses the electronic components previously described, which is integrally formed with a resiliently deformable loop 72 that can be worn around the wrist or ankle of a user, or attached by other means to a piece of clothing or luggage worn or carried by the user. The main body portion 70 comprises a light/button that, when pressed, triggers an alarm signal on the system. The alarm signal is broadcast, via the short-range wireless transceivers 40 previously described, to other units 12, 14, 16, 18 in the system 10. Upon receipt of an alarm signal by any of the other units 12, 14, 16, 18, the button illuminates brightly or flashes, indicating an alarm situation. The main body portion 70 of each wristband additionally comprises a vibrator to provide tactile feedback to a wearer of the unit 12, 14, 16, 18, as well as a buzzer/beeper, which emits an audible signal upon receipt of an alarm signal. Although not shown, each unit 12, 14, 16, 18 comprises an internal rechargeable battery, which can be wirelessly recharged, for example, using induction charging. In one embodiment of the disclosure, a multi-unit charger comprises an elongate rod containing an induction coil, over which the wristbands can be dropped to be charged.

The master unit 18, shown in FIG. 2, additionally comprises a connection button 74 that, when pressed, initiates a wireless connection sequence, via the short-range transceiver, to a nearby portable electronic device 100. The electronic device is pre-loaded with an application that interfaces with the master unit 18, and comprises a display screen 76 upon which the locations and IDs of the other units 12, 14, 16 are plotted graphically. Thus, the user of the master unit 18 can readily ascertain the relative and/or physical locations of the other units in the system 10 simply by viewing the display screen 76 of the electronic device 100. The display screen 76 thus has markers 102 corresponding to each of the units 12, 14, 16 in the system 10.

The application loaded in the electronic device 100 is configured to monitor, over time, the locations of each of the other units 12, 14, 16 in the system 10 and to calculate a direction of travel for each of the units. The direction of travel is indicated on the display screen 76 by way of a directional arrow of travel vector 104 corresponding to each of the markers 102.

The application loaded on the electronic device 100 further allows a user to define or draw on a perimeter 106 on the GUI. Thus, the user of the master unit 18 can set boundaries of travel for the other units 12, 14, 16. In the illustrated example, it will be noted that the marker 102 corresponding to the third slave unit is "out of bounds," but that the direction of travel vector 104 indicates that the third slave unit 16 is travelling back toward the perimeter 106. In this case, an "amber" warning may be signified on the display screen 76 of the electronic device 100, in a notification area 110, indicating that although third slave unit 16 is out of bounds, it is travelling back toward the perimeter.

Conversely, first slave unit 12 is just within the perimeter 106, but its direction of travel vector 104 indicates that it will soon leave the perimeter 106. In this case, a "red" warning can be displayed in the notification area 110 of the GUI, and/or an alarm signal may be triggered within the master unit 18 to alert the supervisor.

If there is a real emergency situation, the user of the master unit 18 can press a third button 112 on the wristband, which triggers an "external alarm" whereby the second data signal is broadcast, via the long-range wireless transceiver 52 to a remote monitoring station 62. The second data file 58 comprises an SMS message, which contains the IDs and last known positions of all of the units 12, 14, 16, 18 in the system 10, as well as a message, which is formulated based on processing carried out by the application in the electronic device 100. The message may be of any suitable type, such as "lost child," of the user of the master unit 18 may be able to compose a bespoke message (e.g., "injured person") or select a suitable message from a drop-down list via the GUI of the electronic device 100.

In the event of an "external" alarm being sent, an alarm signal is broadcast and relayed on the internal network of the system, via the short-range wireless transceivers 40. Receipt of this signal by the other units 12, 14, 16 in the system 10 can be configured to result in an audible and/or visible and/or tactile alarm, thus prompting users of the other device to take particular action (e.g., return to teacher).

In further embodiments of the disclosure, the list files 34, 341, 342, 343 of each of the units may additionally comprise logical information, such as from which other unit in the system 10, IDs and position data have been received. Thus, even if the actual locations of particular units in the system 10 are not known, it may be possible to deduce the position of "missing" units based upon knowledge of which units (whose locations are known), last received data from units whose positions are not known, and then to triangulate an approximate location for missing units. This may be carried out in the application of the electronic device 100, or it may be carried out by the remote monitoring station 62. In either case, the system, by knowing not only the locations of some/all of the units, as well as the logical connections between the units, the re-location of "lost" units may be facilitated.

Figure 3:
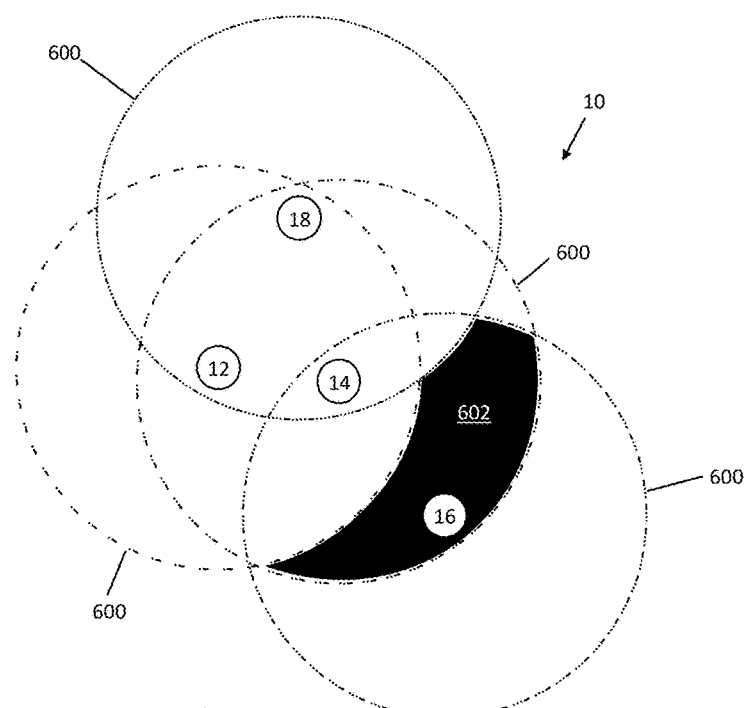
FIGS. 3 through 7 are schematic diagrams each illustrating how a location system in accordance with embodiments of the disclosure can triangulate the positions of units.

Referring now to FIG. 3 of the drawings, a schematic diagram is shown that illustrates how, in a normal mode of operation, the location system of the disclosure triangulates the positions of the units 12, 14. 16 18.

In FIG. 3, the location system 10 has three slave units 12, 14, 16 and a single master unit 18. Each short-range wireless transceiver has a range circle 600, as indicated schematically by the dashed circles. Initially, two of the slave units, first and second slave units 12, 14 are in-range of the master unit 18 and each other, i.e., their range circles 600 mutually overlap; but the third slave unit 16 is only in-range only of the second slave unit 14. Given that the approximate range of each unit 12, 14, 16, 18 is known, from this, it can be established that the third slave unit 16 must be somewhere in the triangulation area 602 shaded black, and thus its position is known to a degree. Clearly, the locations of the other two slave units, first and second slave units 12, 14 are better-known due to the tighter overlapping of the other circles, but it will be appreciated that an estimate of each unit's location can be obtained from ID and routing data alone.

Figure 4:
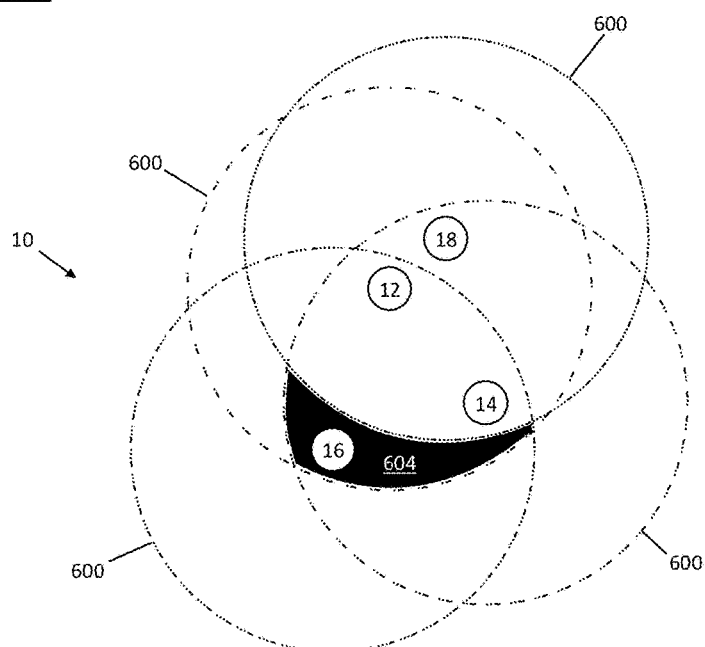

Referring now to FIG. 4 of the drawings, the first slave unit 12 has moved closer to the master unit 18, and the third slave unit 16 has moved towards where the first slave unit 12 was initially. Now, the overlapping circles 600 have been reorganized, but it can be seen that the third slave unit 16 is now in-range of the other two slave units, first and second slave units 12, 14, and so its estimated position 604 has changed.

FIGS. 3 and 4 show how a location system in accordance with the disclosure can approximately triangulate the positions of the units in the system based on the IDs and routing data alone of each unit.

Figure 5:
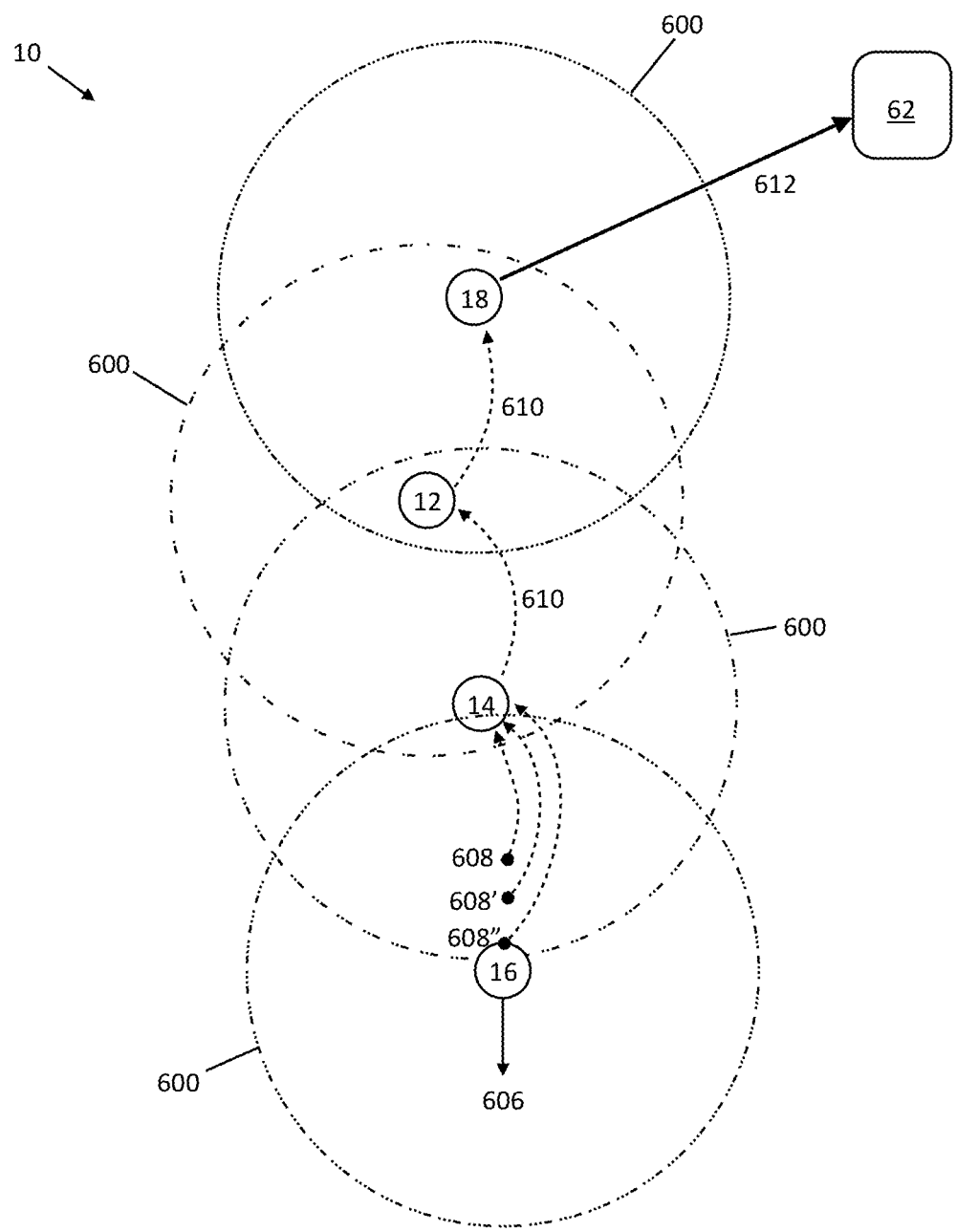

In FIG. 5, the third slave unit 16 is moving 606 out of the group and is only on contact with one other slave unit, second slave unit 14. As third slave unit 16 is only in contact with one other slave unit, second slave unit 14, it begins to transmit its GPS coordinates 608, which are relayed 610 to the master unit 18 as described herein. The direction and speed of travel 606 of the third slave unit 16 can be estimated or calculated based on a series of position data 608, 608', 608" as broadcast by the third slave unit 16 immediately prior to becoming out-of-range of all other units 12, 14, 18. The master unit 18 can, at this stage, broadcast a distress signal on the ad-hoc mesh network of the system 10, or it can use its long-range wireless transceiver to broadcast or transmit a distress call 612 to an external remote monitoring station 62, as described hereinabove.

Figure 6:
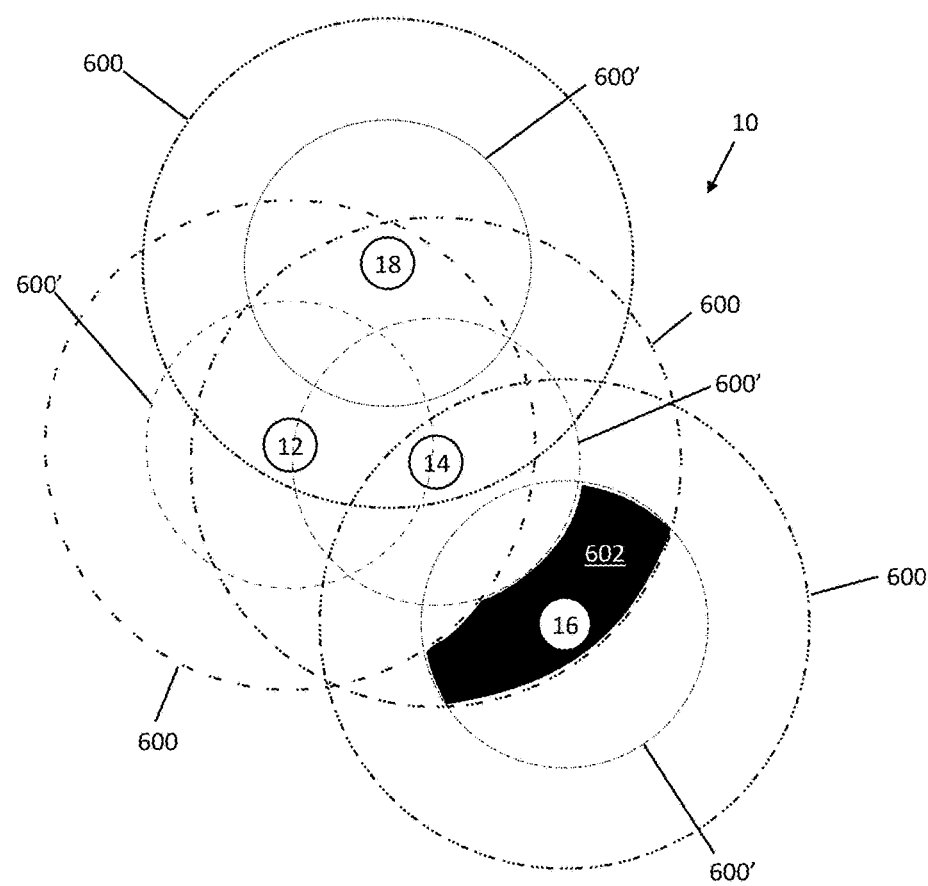

In a yet further embodiment of the disclosure, as shown in FIG. 6 of the drawings, the short-range wireless transceivers are capable of detecting their approximate distances from their in-range neighbors. This can be accomplished in various ways, but it will be appreciated, for example, that various IEE 802.XX standards for wireless networks have bit-rate throttling protocols that depend on the error rates of received signals, to which there is a relationship with distance. Also, each unit may be able to estimate its distance from its nearest neighbors by measuring the signal strength of received signals.

Therefore, even though the short-range wireless transceivers may not know the exact distances to their in-range neighbors, an estimate of distance may be obtained, for example, by noting the signal strength, whether the bit-rate has been throttled for a particular in-range neighbor, or its error-rate.

In FIG. 6 of the drawings, therefore, each range circle 600 is now made up of a number of concentric circles 600, 600', which correspond, in this example, to no bit-rate throttling 600 and 50% bit-rate throttling 600'. Now, the triangulation of the locations of the units 12, 14, 16, 18 in the system 10 can be greatly improved. Compare, for example, the system 10 of FIG. 6, which represents the same physical layout of units as shown in FIG. 3 of the drawings. However, this time, the triangulation area 602 is much smaller because it is known that third slave unit 16 is out-of-range of first slave unit 12 and master unit 18, but lies somewhere between the maximum range 600 of second slave unit 14 and the half-range circumference 600' of second slave unit 14.

Figure 7:
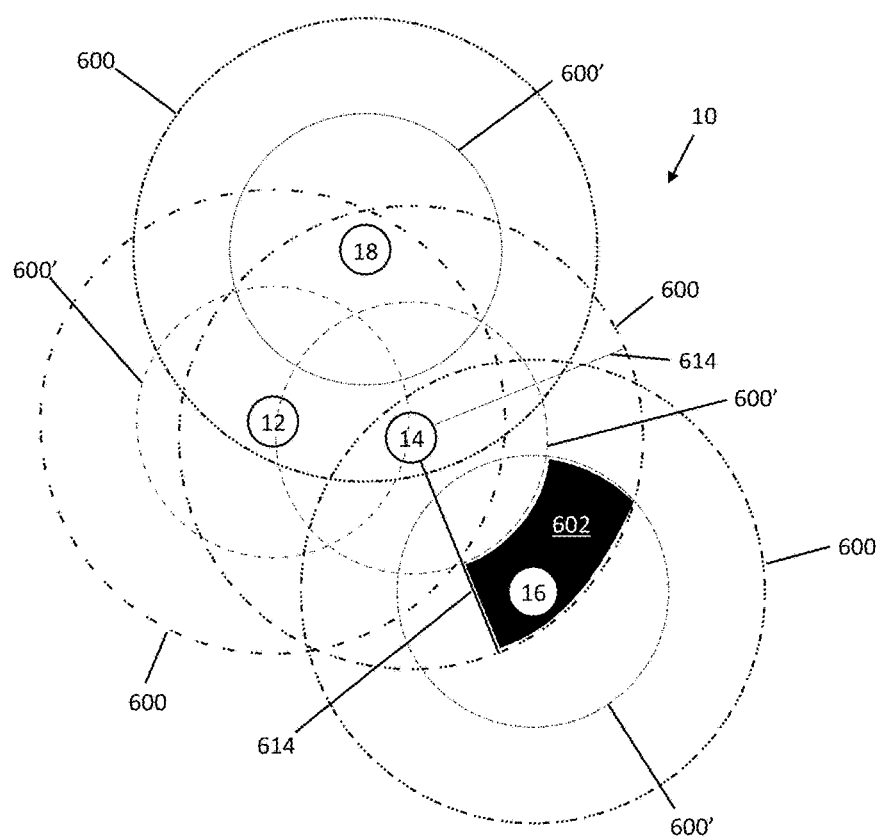

Other ranging methodologies may be used and fall within the scope of this disclosure. Also, certain short-range wireless transceivers may include directional transceivers, which may, as shown in FIG. 7 of the drawings, be able to narrow-down the triangulation area 602 yet further by known from which quadrant 614, say, a received signal from other in-range units 16 has been received.

In summary, the disclosure relates to location systems 10 suitable for monitoring the locations of people or objects within a group. Each person or object has a master unit 18 or slave unit 12, which has a short-range wireless transceiver 40. Each unit 12, 14, 16, 18 has a unique identifier (ID), and an ad-hoc mesh network is created between the units 12, 14, 16, 18 using short-range wireless connections between the units 12, 14, 16, 18. Each unit 12, 14, 16, 18 periodically broadcasts its ID, and that is received by other in-range units 12, 14, 16, 18, which compile a list of received IDs and routing data: the IDs of the other units from which each ID was received. The IDs are routing data are shared on the ad-hoc mesh network, and this enables the locations of the units 12, 14, 16, 18 to be approximately triangulated by placing the master or slave units in a virtual map in which the routing data for each received ID corresponds to that in the second data signal, and wherein the placement of the master or slave units in the virtual map is also correct with regard to the estimated range of each master or slave unit. Each unit 12, 14, 16, 18 is able to determine its absolute position, when required, for example, using a GPS receiver 24, and this can also be shared on the ad-hoc mesh network. By using primarily short-range communications, the power consumption of each unit is reduced, as well as the incidence of erroneous transmission of signals and reception 60 to an external or public network of a remote monitoring station 62. However, the master unit 18 has a long-range wireless transceiver to enable it to transmit, for example, a distress signal to an external remote monitoring station 62.

The following statements are not the claims, but relate to various possible and/or preferred features and/or embodiments of the disclosure:

Statement 1: A location system comprising one or more master units and one or more slave units, the or each master unit comprising: a short-range wireless transceiver and a location detection means operatively connected to the short-range wireless transceiver, the short-range wireless transceiver being adapted to periodically broadcast an ID of the master unit and to selectively broadcast the location of the master unit as determined by the master unit's location detection means, and a long-range wireless transceiver, the or each slave unit comprising: a short-range wireless transceiver and a location detection means operatively connected to the short-range wireless transceiver, the short-range wireless transceiver being adapted to periodically broadcast an ID of the slave unit and to selectively broadcast a location of the slave unit as determined by the slave unit's location detection means, wherein the short-range wireless transceivers of the master and slave units are adapted to receive the IDs and, where available, the locations of other in-range master or slave units; and to broadcast a first data signal comprising the IDs and, where available, the location of the master or slave unit and the ID and, where available, the locations of other in-range master or slave units; and wherein the short-range wireless transceivers of the master units are adapted to receive the first data signals of in-range master or slave units and to broadcast a second data signal comprising the IDs and, where available, the locations of the master and slave units contained in the received first data signals; and wherein the or each master unit is adapted to selectively broadcast the second data signal via the long-range wireless transceiver.

Statement 2: The location system of statement 1, wherein the or each master or slave unit is adapted to periodically broadcast the location of the respective master or slave unit, and wherein the second data signal comprises the locations of the master and slave units contained in the received first data signals.

Statement 3: The location system of statement 1 or statement 2, wherein the first and/or second signal comprises the IDs of the master or slave units and routing data for each ID.

Statement 4: The location system of statement 3, wherein the routing data comprises the ID of every unit from which a particular ID was received.

Statement 5: The location system of any preceding statement, wherein the short-range wireless transceivers are adapted to estimate the range of other in-range master or slave units.

Statement 6: The location system of statement 5, wherein the range of other in-range master or slave units is estimated by monitoring any one or more of the group comprising: signal strength, a bit-rate, a bit-rate throttling level, and an error rate, in the received signals from other in-range master or slave units.

Statement 7: The location system of any preceding statement, wherein the short-range wireless transceivers comprise directional transceivers adapted to detect a direction from which a signal is received.

Statement 8: The location system of any preceding statement, wherein the location detection means comprises a GPS receiver adapted, in use, to determine the location of the respective unit and to output instantaneous location data.

Statement 9: The location system of statement 8, wherein the GPS receiver of each master or slave unit is normally in a standby state, and is switched to an active state when the respective master or slave unit is in contact with fewer than a specified minimum number of other master or slave units.

Statement 10: The location system of statement 9, wherein the specified minimum number of other master or slave units is two.

Statement 11: The location system of statement 9, wherein the specified minimum number of other master or slave units is one.

Statement 12: The location system of any of statements 8 to 11, further comprising a processing unit adapted, in use, to receive and process the location data from the GPS receiver and to output the processed location data to the short-range wireless transceiver for onward transmission as the first data signal to other in-range master or slave units.

Statement 13: The location system of any preceding statement, wherein the first data signal comprises an ID and a last known location of each respective master or slave unit.

Statement 14: The location system of any preceding statement, wherein the or each unit comprises a master processing unit adapted, in use, to compile received first data signals and to compile a master table of IDs and last known locations of each master or slave unit.

Statement 15: The location system of statement 14, wherein the second data signal comprises a de-duplicated set of IDs and last known locations of the first data signals.

Statement 16: The location system of any preceding statement, wherein each master or slave unit is configured to periodically determine its position.

Statement 17: The location system of any preceding statement, wherein a master or slave unit further comprises an alarm trigger that, when activated, broadcasts, via the short-range wireless transceiver, an alarm signal comprising an ID and last known position of the respective master or slave unit.

Statement 18: The location system of statement 17, wherein the alarm trigger comprises a push button of the master or slave unit.

Statement 19: The location system of any of statements 5 to 9, wherein the master processing unit is configured to process the IDs and locations of each of the other master and slave units in the system and to plot the IDs and positions of the units on a map or on a relative map.

Statement 20: The location system of statement 10, wherein the map or relative map comprises a boundary, and wherein the master processing unit is configured to determine when any one or more of the master or slave units approaches or leaves the boundary; and to output an alarm signal upon determination of one or more of the master or slave units approaching or leaving the boundary, the alarm signal comprising the ID and the last known position of the master or slave unit identified as approaching or leaving the boundary.

Statement 21: The location system of statement 10 or statement 11, wherein at least one master unit comprises a display screen adapted, in use, to display the map or relative map, the boundary and the IDs and locations of the other master and slave units in the system.

Statement 22: The location system of any of statements 8 to 12, wherein the alarm signal is relayed, via one or more short-range transceivers of the location system, to the master or slave unit identified by the master processing unit as approaching or leaving the boundary.

Statement 23: The location system of any of statements 8 to 13, wherein the or each master or slave unit comprises a speaker, and wherein upon receipt of an alarm signal, the master or slave unit is configured to output an audible alarm via the speaker.

Statement 24: The location system of any of statements 8 to 14, wherein the alarm signal is transmitted via the long-range wireless transceiver of a master unit to a remote monitoring station.

Statement 25: The location system of statement 15, wherein the master unit is configured to automatically transmit the alarm signal via its long-range transceiver.

Statement 26: The location system of any preceding statement, wherein the short-range wireless transceiver comprises any one or more of the group comprising: an IEEE 802.15.4 standard transceiver, an IEEE 802.15.1 standard transceiver, and an IEEE 802.11 standard transceiver.

Statement 27: The location system of any preceding statement, wherein the long-range wireless transceiver comprises any one or more of the group comprising: a public wireless telephony transceiver, a GSM transceiver, a GPRS transceiver, a 3G transceiver, a 4G transceiver, a satellite telephony transceiver, a VHF transceiver, a UHF transceiver, a GMDSS transceiver, and an EPIRB transceiver.

Statement 28: The location system of any preceding statement, wherein the second data signal comprises an SMS message containing the locations of the master or slave units.

Statement 29: The location system of any preceding statement, wherein the second data signal comprises a computer-generated voice message containing the locations of the master or slave units.

Statement 30: The location system of statement 28 or statement 29, wherein the or each master unit is adapted to transmit, via a public wireless telephony network, the SMS message or the automated voice message to a pre-designated telephone number.

Statement 31: The location system of statement 30, wherein the pre-designated telephone number comprises an emergency services telephone number.

Statement 32: The location system of any preceding statement, wherein the or each master or slave unit is integrated into a wristband comprising a main body portion that houses the electronic components, a combined light/button that, when pressed, triggers an alarm signal and that, upon receipt of an alarm signal by any of the other units, illuminates.

Statement 33: The location system of statement 32, wherein the wristband further comprises a vibrator adapted, in use, to provide tactile feedback to a wearer of the wristband.

Statement 34: The location system of statement 32 or 33, wherein the wristband further comprises a buzzer/beeper adapted, in use, to provide audible feedback to a wearer of the wristband.

Statement 35: The location system of statement 32, 33 or 34, wherein the wristband further comprises an internal rechargeable battery and a wireless recharging coil.

Statement 36: The location system of any of statements 32 to 35, wherein the master unit wristband further comprises a connection button that, when pressed, initiates a wireless connection sequence, via the short-range transceiver, to a nearby portable electronic device.

Statement 37: The location system of statement 36, wherein the portable electronic device comprises an application adapted to interface with the master unit, and a display screen upon which the locations and IDs of the other units are plotted graphically.

Statement 38: A method of monitoring the positions of a plurality of master or slave units in a location system according to any of statements 3 to 37, the method comprising analyzing the IDs and routing data of the units and triangulating, based on a known approximate maximum range of each master or slave unit, the positions of each master or slave unit by placing the master or slave units in a virtual map in which the routing data for each received ID corresponds to that in the second data signal.

Statement 39: The method of statement 38, further comprising the step of estimating the range of each master or slave unit from its in-range neighbors, and placing the master or slave units in a virtual map in which the routing data for each received ID corresponds to that in the second data signal, and wherein the placement of the master or slave units in the virtual map is also correct with regard to the estimated ranges of each master or slave unit from their in-range neighbors, as determined by the routing data.

Statement 40: The method of statement 38 or 39, further comprising the step of estimating the direction of each master or slave unit to/from its in-range neighbors, and placing the master or slave units in a virtual map in which the routing data for each received ID corresponds to that in the second data signal, and wherein the placement of the master or slave units in the virtual map is also correct with regard to the estimated directions of each master or slave unit from their in-range neighbors, as determined by the routing data.

Statement 41: A method of monitoring the positions of a plurality of master or slave units in a location system according to any preceding statement, the method comprising each master or slave unit: periodically determining its absolute position and broadcasting its ID and position via the short-range transceiver to other in-range master or slave units; receiving the IDs of other in-range master or slave units; compiling and de-duplicating a table of IDs and locations of other master or slave units; and re-broadcasting the compiled and de-duplicated table to other in-range master or slave units.

Statement 42: A method of monitoring the positions of a plurality of master or slave units in a location system according to any preceding statement, the method comprising each master or slave unit: periodically broadcasting its ID via the short-range transceiver to other in-range master or slave units; receiving the IDs of other in-range master or slave units along with logical data comprising the ID of another unit in the system from which the IDs were received; compiling a table of IDs and logical data; and calculating an approximate location of the or each unit based on an estimated range of the short-range transceivers and the logical pathways via which IDs have been able to be routed through the location system.

Statement 43: A location system substantially as hereinbefore described, with reference to, and as illustrated in, FIGS. 1 and 2 of the accompanying drawings.

Statement 44: A location method substantially as hereinbefore described, with reference to, and as illustrated in, FIGS. 3 to 7 of the accompanying drawings.

The disclosure is not restricted to the details of the foregoing embodiments, which are merely exemplary of the disclosure. For example, the features and methods described for each embodiment are not mutually exclusive in other embodiments: any combination of features or methods described in relation to particular embodiments herein may be combined with features or methods described in relation to other embodiments, and be employed in a location system or method in accordance with the disclosure. Any distances, dimensions, wireless protocols, location methods, location devices, materials of manufacture, operating systems, applications, calculations, etc., are possible or preferred suggestions, and are not intended to be strictly limiting of the scope of the disclosure.

The invention claimed is:

1. A location system comprising one or more master units and one or more slave units, the one or more or each master unit comprising:
    a short-range wireless transceiver and a location detection means operatively connected to the short-range wireless transceiver, the short-range wireless transceiver being adapted to periodically broadcast an ID of the master unit and to selectively broadcast the location of the master unit as determined by the master unit's location detection means; and
    a long-range wireless transceiver;
    the one or more or each slave unit comprising:
    a short-range wireless transceiver and a location detection means operatively connected to the short-range wireless transceiver, the short-range wireless transceiver being adapted to periodically broadcast an ID of the slave unit and to selectively broadcast a location of the slave unit as determined by the slave unit's location detection means, wherein, the short-range wireless transceivers of the master and slave units are adapted to receive the IDs and, where available, the locations of other in-range master or slave units; and
    to broadcast a first data signal comprising the IDs and, where available, the location of the master or slave unit and the ID and, where available, the locations of other in-range master or slave units; and wherein,
    the short-range wireless transceivers of the master units are adapted to receive the first data signals of in-range master or slave units and to broadcast a second data signal comprising the IDs and, where available, the locations of the master and slave units contained in the received first data signals; and wherein,
    the one or more or each master unit is adapted to selectively broadcast the second data signal via the long-range wireless transceiver.

2. The location system of claim 1, wherein the one or more or each master or slave unit is adapted to periodically broadcast the location of the respective master or slave unit, and wherein the second data signal comprises the locations of the master and slave units contained in the received first data signals.

3. The location system of claim 1, wherein the first and/or second data signal comprises any one or more of the group consisting of: the IDs of the master or slave units and routing data for each ID, the routing data comprising the ID of every unit from which a particular ID was received, and an ID and a last known location of each respective master or slave unit.

4. A method of monitoring positions of a plurality of master or slave units in a location system according to claim 3, the method comprising:
    analyzing the IDs and routing data of the master or slave units and triangulating, based on a known approximate maximum range of each master or slave unit, the positions of each master or slave unit by placing the master or slave units in a virtual map in which the routing data for each received ID corresponds to that in the second data signal;
    estimating the range of each master or slave unit from its in-range neighbors, and placing the master or slave units in a virtual map in which the routing data for each received ID corresponds to that in the second data signal, and wherein placement of the master or slave units in the virtual map is also correct with regard to the estimated ranges of each master or slave unit from their in-range neighbors, as determined by the routing data; and estimating a direction of each master or slave unit to/from its in-range neighbors, and placing the master or slave units in a virtual map in which the routing data for each received ID corresponds to that in the second data signal, and wherein the placement of the master or slave units in the virtual map is also correct with regard to the estimated directions of each master or slave unit from their in-range neighbors, as determined by the routing data.

5. The location system of claim 1, wherein the short-range wireless transceivers comprise directional transceivers adapted to detect a direction from which a signal is received and/or are adapted to estimate the range of other in-range master or slave units, and wherein the range of other in-range master or slave units is estimated by monitoring any one or more of the group comprising: signal strength, a bit-rate, a bit-rate throttling level, and an error rate, in the received signals from other in-range master or slave units.

6. The location system of claim 1, wherein the location detection means comprises a GPS receiver adapted, in use, to determine the location of the respective unit and to output instantaneous location data.

7. The location system of claim 6, further comprising any one or more of the group consisting of:
a processing unit adapted, in use, to receive and process the location data from the GPS receiver and to output the processed location data to the short-range wireless transceiver for onward transmission as the first data signal to other in-range master or slave units; and
a master processing unit adapted, in use, to compile received first data signals and to compile a master table of IDs and last known locations of each master or slave unit.

8. The location system of claim 7, wherein the master processing unit is configured to process the IDs and locations of each of the other master and slave units in the location system and to plot the IDs and positions of the master and slave units on a map or on a relative map.

9. The location system of claim 8, wherein the map or relative map comprises a boundary, and wherein the master processing unit is configured to determine when any one or more of the master or slave units approaches or leaves the boundary; and to output an alarm signal upon determination of one or more of the master or slave units approaching or leaving the boundary, the alarm signal comprising the ID and the last known position of the master or slave unit identified as approaching or leaving the boundary.

10. The location system of claim 8, wherein the master unit comprises a display screen adapted, in use, to display the map or relative map, a boundary and the IDs and locations of the other master and slave units in the location system.

11. The location system of claim 6, wherein the GPS receiver of each master or slave unit is normally in a standby state, and is switched to an active state when the respective master or slave unit is in contact with fewer than a specified minimum number of other master or slave units.

12. The location system of claim 1, wherein each master or slave unit is configured to periodically determine its position.

13. The location system of claim 1, wherein a master or slave unit further comprises an alarm trigger that, when activated, broadcasts, via the short-range wireless transceiver, an alarm signal comprising an ID and last known position of the respective master or slave unit.

14. The location system of claim 13, wherein the alarm signal is relayed, via one or more short-range transceivers of the location system, to the master or slave unit identified by a master processing unit as approaching or leaving a boundary.

15. The location system of claim 13, wherein the one or more or each master or slave unit comprises a speaker, and wherein upon receipt of an alarm signal, the master or slave unit is configured to output an audible alarm via the speaker.

16. The location system of claim 13, wherein the alarm signal is automatically transmitted via the long-range wireless transceiver of a master unit to a remote monitoring station.

17. The location system of claim 13, wherein the alarm trigger comprises a push button of the master or slave unit.

18. The location system of claim 1, wherein the short-range wireless transceiver comprises any one or more of the group comprising:
an IEEE 802.15.4 standard transceiver;
an IEEE 802.15.1 standard transceiver; and
an IEEE 802.11 standard transceiver, and
wherein the long-range wireless transceiver comprises any one or more of the group comprising:
a public wireless telephony transceiver;
a GSM transceiver;
a GPRS transceiver;
a 3G transceiver;
a 4G transceiver;
a satellite telephony transceiver;
a VHF transceiver;
a UHF transceiver;
a GMDSS transceiver; and
an EPIRB transceiver.

19. The location system of claim 1, wherein the second data signal comprises any one or more of:
an SMS message containing the locations of the master or slave units; and
a computer-generated voice message containing the locations of the master or slave units, and wherein the one or more or each master unit is adapted to transmit, via a public wireless telephony network, the SMS message or the computer-generated voice message to a pre-designated telephone number.

20. The location system of claim 1, wherein the one or more or each master or slave unit is integrated into a wristband comprising a main body portion that houses electronic components, a combined light/button that, when pressed, triggers an alarm signal and that, upon receipt of an alarm signal by any of the other units, illuminates, and further comprising any one or more of the group consisting of:
a vibrator adapted, in use, to provide tactile feedback to a wearer of the wristband;
a buzzer/beeper adapted, in use, to provide audible feedback to a wearer of the wristband;
an internal rechargeable battery and a wireless recharging coil;
a connection button that, when pressed, initiates a wireless connection sequence, via the short-range wireless transceiver, to a nearby portable electronic device; and
an application adapted to interface with the master unit, and a display screen upon which the locations and IDs of the other units are plotted graphically.

* * * * *